United States Patent Office 3,686,194
Patented Aug. 22, 1972

3,686,194
PROCESS FOR THE PRODUCTION OF
CYANOPYRIDINES
Ferdinand Hagedorn, Cologne - Buchheim, Karlfried Wedemeyer, Cologne-Stammheim, Bernhard Scherhag, Leverkusen, and Arnold Hausweiler, Dormagen, Germany, assignors to Farbenfabriken Bayer Aktiengesellschaft, Leverkusen, Germany
No Drawing. Filed June 27, 1969, Ser. No. 837,305
Claims priority, application Germany, July 10, 1968,
P 17 70 841.7
Int. Cl. C07d 31/46
U.S. Cl. 260—294.9                    7 Claims

ABSTRACT OF THE DISCLOSURE

Cyanopyridines are prepared by the vapor phase reaction of an alkyl pyridine, oxygen and ammonia in the presence of a tin phosphate catalyst activated with compound of molybdenum, bismuth, vanadium, iron or cobalt.

---

This invention relates to a process for the production of cyanopyridines.

It is known that the reaction of alkyl-substituted pyridines with ammonia and oxygen in the gas phase on catalysts at elevated temperature leads to formation of the corresponding cyanopyridines.

The catalysts used in conventional processes for the production of cyanopyridines from alkyl pyridines are of the kind which promote the formation of oxidation products, such as aldehydes and carboxylic acids, in the reaction of alkyl substituted aromatic hydrocarbons with molecular oxygen in the gas phase at elevated temperatures. Catalysts of this kind also initiate the oxidation of alkyl pyridines, although no cyanopyridines are formed when ammonia is also present. This is because a considerable proportion of the ammonia used is oxidised into nitrogen on catalysts such as these, with the result that it cannot be used for nitrile formation. Catalysts of this kind are also incapable of chemically absorbing ammonia to a sufficient extent. For this reason, ammonia has to be used in a fairly large excess instead of in a stoichiometric ratio in order to obtain satisfactory yields when catalysts of this kind are used in the synthesis of cyanopyridines. According to U.S. Pat. No. 2,510,605, for example, at least two mols of ammonia have to be used per alkyl group of an alkyl pyridine. It is also clearly shown in U.S. Pats. No. 2,592,123 and 2,839,535 that an excess of ammonia is required to obtain satisfactory yields. Accordingly, the ammonia used in these processes is utilised very inefficiently.

Apart from this, the conditions under which the processes are carried out are limited very considerably by the explosive limits of the mixtures of alkyl pyridines, ammonia and air. For example, the explosive limits in air at 20° C./760 torr lie between 1.3% by volume and 12% by volume for isomeric picolines, and between 15% by volume and 28% by volume for ammonia. Accordingly, if from 1.5 to 2 mols of ammonia are required per mol of picoline, the reaction can only be carried out at the lower explosive limit; in other words, the picoline content of the gas mixture must remain below 1.3% by volume. Consequently, it is only possible to obtain a limited volume/time yield in the aforementioned processes.

According to U.S. Pat. No. 3,297,587, picolines are reacted to form cyanopyridines in the presence of boron phosphate catalysts activated with compounds of the metals bismuth, molybdenum, vanadium, iron or cobalt. Unfortunately, these catalysts are partly split up into boric acid and phosphoric acid during the reaction in the presence of ammonia and steam. As a result, firmly adhering crusts of boron phosphate can be deposited in the working-up section of an industrial installation through recombination of the decomposition products on cooling, detrimentally affecting production. In addition, the loss of catalyst, which in any event is very considerable as a result of mechanical abrasion in fluidised-bed processes, is even further increased through chemical dissociation of the boron phosphate.

A process for the production of cyanopyridines by reacting alkyl pyridines with ammonia and oxygen or air and, optionally, steam in the gas phase on catalysts, has now been found wherein the catalysts are tin phosphate catalysts which have been activated with compounds of the metals molybdenum, bismuth, vanadium, iron or cobalt.

In the context of the present invention, tin phosphates are compounds of orthophosphoric acid, pyrophosphoric acid or polyphosphoric acid with tin which are formed during the reaction of these phosphoric acids with compounds of tin such as $\alpha$- or $\beta$ stannic acid (stannic oxide hydrates), stannous oxide, stannous nitrate, stannic nitrate, stannic chloride, stannic oxide, or mixtures of these compounds, in solution or in the liquid or solid state, or during the reaction of stannous chloride with concentrated sulphuric acid, followed by reaction of the stannic sulphate formed with one of the aforementioned phosphoric acids.

The tin phosphates used as catalyst materials may contain from 10 to 40 parts by weight of phosphorus to 100 parts by weight of tin phosphate.

The catalysts may be mixed, if desired with inert supporting materials such as silica.

These catalysts are activated with compounds of the metals molybdenum, bismuth, vanadium, iron or cobalt, or with mixtures of compounds of two or more of these metals. In general, activation may be brought about by adding the metal compounds to the catalyst and then heating the resulting mass. The content of the aforementioned metals in the completed catalyst should be from 1 to 10% by weight based on the tin phosphate.

Examples of suitable compounds of the aforementioned metals include their phosphates, nitrates, oxides and hydroxides. It is also possible to use other salts, for example those in which the metal is present in the anion. Examples include ammonium molybdate, bismuth nitrate, vanadium oxide, iron phosphate and cobalt nitrate. In principle, the only requirement which the compounds have to satisfy is that they should readily lend themselves to conversion into an oxidic form in the presence of the tin phosphate.

The aforementioned catalysts may be prepared by various processes, although they are preferably prepared by mixing a phosphoric acid, a tin compound such as $\alpha$- or $\beta$-stannic acid, and a concentrated aqueous or nitric acid solution of a compound of the activating metal for example ammonium molybdate or bismuth nitrate and allowing the mixture to stand. The activating metal may, however, also be added in the form of an oxide or hydroxide, for example $MoO_3$, $Bi_2O_3$ or $V_2O_5$.

The catalyst mass is then dried at a temperature of from 100 to 150° C., followed by heating for several hours at 500° C. and then by tempering at a temperature of up to 900° C.

In the context of this invention, alkyl pyridines are pyridines substituted on carbon atoms by alkyl groups. One or more (for example two or three) alkyl groups may be present. Preferred alkyl groups include those with up to 6 carbon atoms, methyl and ethyl groups in particular. Examples of suitable alkyl pyridines include 2-, 3- or 4-methyl-pyridine, 2-, 3- or 4-ethyl pyridine, lutidines and collidines.

The reaction according to the invention of an alkyl-substituted pyridine with ammonia and molecular oxygen to form a cyanopyridine may be carried out in a moving bed or fluidised bed or with catalysts fixedly arranged in the reaction zone. In some instances, the catalysts only reach their highest level of activity after a period of operation.

The oxygen required for the reaction of alkyl-substituted pyridines with ammonia to form cyanopyridines may be supplied either in pure form or in the form of air. The molar ratio of oxygen to alkyl pyridine may vary within wide limits and is governed inter alia by the number of alkyl groups in the substituted pyridine, by the reaction conditions and by the explosive limits. Good results are obtained by using the particular stoichiometric ratio required of 1.5 mol of oxygen per methyl or methylene group. In general, satisfactory results are also obtained with a ratio of from 0.5:1 to 20:1 of oxygen to alkyl pyridine.

The alkyl substituted pyridines may be used either in pure form or in admixture with one another. The molar ratio of ammonia to alkyl pyridine is governed by the number of lateral alkyl groups which are to be converted into cyano groups. In general, 1 mol of ammonia should be used per mol of alkyl group. Although there is no need to use an excess of ammonia, satisfactory results are still obtained with an excess of ammonia. Depending upon the process conditions, which in every instance are governed by the explosive limits, satisfactory results are obtained with from 0.5 to 1.5 mols of ammonia per alkyl group.

One major disadvantage of the process according to U.S.Pat. No. 3,297,587 is that it is only possible to react in high yields on the boron phosphate catalysts specified picoline-ammonia-air mixtures to which steam is added in high concentrations (preferably about 7.5 mols of steam per mol of alkyl pyridine) before the reaction. In the absence of steam, the catalyst does not exhibit its specific activity.

By contrast, it has now been found that when activated tin phosphate catalysts are used in accordance with the present invention, cyanopyridine yields even higher than those obtained in U.S. Pat. No. 3,297,587 can be produced when no steam is added to the mixture of alkyl pyridine, ammonia and oxygen. It follows from this that the process according to this invention also provides better volume/time yields than the process disclosed in U.S. Pat. No. 3,297,587.

Since the overall reaction involved in the oxidation of alkyl pyridines with ammonia is highly exothermic, the energy which is generated when the process is carried out on a commercial scale is best put to use, for example for generating steam. So far as the process according to the invention is concerned, this energy can be fully utilised. The energy which is inevitably consumed in the process described in U.S. Pat. No. 3,297,587 in generating the steam to be used, is additionally recovered when the catalysts based on tin phosphate are used according to the present invention. This fact also constitutes an advantage of the present invention over our own earlier process.

The process according to the invention may, however, also be carried out in the presence of steam. In this embodiment it is another advantage of the process according to the invention that the new catalysts based on tin phosphate are stable under the reaction conditions, particularly at elevated temperatures and in the presence of high concentrations of steam and ammonia. As already mentioned above, boron phosphate catalysts of the kind disclosed in U.S. Pat. No. 3,297,587, are decomposed into boric acid and phosphoric acid under the reaction conditions.

The temperature at which alkyl-substituted pyridines are reacted with ammonia and molecular oxygen to form cyanopyridines on tin phosphate catalysts is generally in the range from 300 to 700° C. and preferably in the range from 350 to 550° C. Apparent contact times of from 0.1 to 30 seconds are usually sufficient, apparent contact times of from 0.2 to 10 seconds being preferred. The apparent contact time is defined as the time in which one unit by volume of the gas mixture, as measured under the temperature and pressure conditions prevailing in the catalyst bed, is in contact with one unit by volume of the catalyst bed.

The cyanopyridines obtainable in accordance with the invention are valuable chemical intermediates. After hydrogenation to aminomethylpyridines they can be used in form of their acrylic acid amides together with acrylonitril for the production of polyacrylonitril fibers which are suitable to be dyed by dyestuffs containing acid groups (see German Pat. No. 1,235,592).

The process is illustrated by the following examples.

EXAMPLE 1

300 parts by weight of granulated tin are reacted at 90° C. with 230 parts by volume of concentrated nitric acid (65% by weight $HNO_3$, $D_{20}=1.39$) and 500 parts by volume of water. The tin oxide hydrate formed is removed by filtration under suction, washed with water and then reacted, while still moist, with 577 parts by weight of orthophosphoric acid (85% by weight $H_3PO_4$, $D_{20}=1.71$), 28 parts by weight of molybdenum (VI) oxide and 78.5 parts by weight of bismuth nitrate

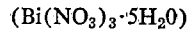

at a temperature of from 100 to 150° C., accompanied by stirring, until the mass sets to form a viscous paste. The product is dried for 5 hours at 200° C., and the subsequently granulated catalyst material is tempered for 5 hours at 500° C. and then for another 2 hours at 900° C.

A mixture heated to 300° C. of 1.0 mol of γ-picoline, 1.05 mol of ammonia and 10.5 mols of air is then passed over this catalyst (which has a grain size of from 0.25 to 0.5 mm.) in a fluidised bed reactor.

The apparent contact time is one second, and the reaction temperature is 430° C.

96% of the picoline is converted. The 4-cyanopyridine yield, based on the picoline reacted, comprises 90%.

EXAMPLE 2

A gas mixture heated to 300° C. of 1.0 of γ-picoline, 1.05 mol of ammonia, 7.5 mols of water and 10.5 mols of air is passed over the catalyst described in Example 1 (which has a grain size of from 0.25 to 0.5 mm.) in a fluidised bed reactor. 80% of the picoline is converted into 4-cyanopyridine. Total picoline conversion is 91%.

EXAMPLE 3

300 parts by weight of granulated tin are reacted at 90° C. with 230 parts by volume of concentrated nitric acid (65% by weight $HNO_3$, $D_{20}=1.39$) and 500 parts by volume of water. The tin oxide hydrate formed is removed by filtration under suction, washed with water and reacted, while still moist, with 577 parts by weight of orthophosphoric acid (85% by weight $H_3PO_4$, $D_{20}=1.71$), 17 parts by weight of molybdenum (VI) oxide and 8 parts by weight of vanadium (V) oxide at a temperature of from 100 to 150° C., accompanied by stirring, until the mass sets to form a viscous paste. The product is dried for 5 hours at 200° C., after which the granulated catalyst material is tempered for 5 hours at 500° C. and then another 2 hours at 900° C.

A mixture, heated to 300° C., of 1 mol of β-picoline, 1.05 mol of ammonia, 10.5 mols of air and 7.5 mols of steam is then passed over this catalyst (which has a grain size of from 0.25 to 0.5 mm.) in a fluidised bed reactor. 92% of the β-picoline is converted at a reaction temperature of 465° C. and an apparent contact time of 1 second. A 3-cyanopyridine yield of 72% is obtained, based on the β-picoline reacted.

EXAMPLE 4

600 parts by weight of granulated tin are reacted at 90° C. with 460 parts by volume of concentrated nitric acid (65% by weight $HNO_3$, $D_{20}=1.39$) and 1000 parts by volume of water. The tin oxide hydrate formed is removed by filtration under suction, washed with water and then reacted, while still moist, with 1154 parts by weight of orthophosphoric acid (85% by weight $H_3PO_4$, $D_{20}=1.71$), 40 parts by weight of molybdenum (VI) oxide and 36 parts by weight of ammonium vanadate at a temperature of from 100 to 150° C., accompanied by stirring, until the mass sets to form a viscous paste. The product is then dried for 5 hours at 200° C. and the subsequently granulated catalyst material is tempered for 5 hours at 500° C. and then for another 2 hours at 900° C.

A mixture, heated to 300° C., of 1 mol of β-picoline, 1.05 mol of ammonia and 10.5 mols of air, is then passed over this catalyst (which has a grain size of from 0.25 to 0.5 mm.) in a fluidised bed reactor. 93% of the β-picoline is converted at a reaction temperature of 515° C. and an apparent contact time of 1 second. The 3-cyanopyridine yield comprises 78%, based on the β-picoline reacted.

EXAMPLE 5

A mixture, heated to 300° C., of 1 mol of γ-picoline, 105 mol of ammonia, 10.5 mols of air and 7.5 mols of steam is passed over a catalyst prepared as in Example 3 (having a grain size of from 0.25 to 0.5 mm.) in a fluidised bed reactor. 96% of the γ-picoline is reacted at a reaction temperature of 410° C. and an apparent contact time of one second. The 4-cyanopyridine yield comprises 82%, based on the γ-picoline reacted.

EXAMPLE 6

A mixture, heated to 300° C., of 1 mol of α-picoline, 1.05 mols of ammonia, 10.5 mols of air and 7.5 mols of steam is passed over a catalyst prepared as in Example 3 (having a grain size of from 0.25 to 0.5 mm.) in a fluidised bed reactor. 46% of the α-picoline is reacted to form 2-cyanopyridine at a reaction temperature of 430° C. The apparent contact time is one second.

EXAMPLE 7

600 parts by weight of granulated tin are reacted at 90° C. with 460 parts by volume of concentrated nitric acid (65% by weight $HNO_3$, $D_{20}=1.39$) and 1000 parts by volume of water. The tin oxide hydrate formed is removed by filtration under suction, washed with water and reacted, while still moist, with 1154 parts by weight of orthophosphoric acid (85% by weight $H_3PO_4$, $D_{20}=1.71$), 50 parts by weight of molybdenum (VI) oxide and 10 parts by weight of cobalt nitrate,

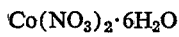
$Co(NO_3)_2 \cdot 6H_2O$ at a temperature of from 100 to 150° C., accompanied by stirring, until the mass sets to form a viscous paste. The product is dried for 5 hours at 200° C. and the subsequently granulated catalyst material is tempered for 5 hours at 500° C. and then for another 2 hours at 900° C.

A mixture, heated to 300° C., of 1 mol of γ-picoline, 1.05 mols of ammonia, 10.5 mols of air and 7.5 mols of steam, is passed over this catalyst (which has a grain size of from 0.25 to 0.5 mm.) in a fluidised bed reactor. 71% of the γ-picoline reacted is converted into 4-cyanopyridine at a reaction temperature of 455° C. 93% of the γ-picoline is reacted.

EXAMPLE 8

A tin phosphate catalyst is prepared as described in Example 7, except that the 10 parts by weight of cobalt nitrate are replaced by 20 parts by weight of ferric nitrate ($Fe(NO_3)_3 \cdot 9H_2O$). The catalyst is dried as in Example 7 and tempered for 5 hours at 500° C. and then for another 4 hours at 900° C.

A mixture, pre-heated to 300° C., for 1 mol of γ-picoline, 1.05 mol of ammonia, 10.5 mols of air and 7.5 mols of steam, is passed over this catalyst (having a grain size of from 0.25 to 0.5 mm.) in a fluidised bed reactor. The reaction temperature is 450° C. and the apparent contact time is 1 second. Under these conditions, 92% of the α-picoline reacts. The 4-cyanopyridine yield amounts to 77%, based on the γ-picoline reacted.

We claim:

1. In a process for producing cyanopyridines from alkyl pyridines wherein the alkyl groups have up to 6 carbon atoms, oxygen and ammonia, the molar ratio of oxygen to alkyl pyridine being from 0.5:1 to 20:1 and the molar ratio of ammonia to alkyl pyridine being from 0.5 to 1.5 moles of ammonia per alkyl group, the improvement which consists essentially of carrying out the reaction in the presence of a stannic phosphate catalyst which has been activated with one or more compounds selected from the group consisting of molybdenum, bismuth, vanadium, iron and cobalt, said compounds being readily converted into the oxidic form in the presence of said stannic phosphate catalyst.

2. Process of claim 1 wherein said stannic phosphate catalyst is activated with one or more compounds selected from the group consisting of the phosphates, nitrates, oxides and hydroxides of molybdenum, bismuth, vanadium, iron and cobalt, and the ammonium compounds of the foregoing wherein the metal is present in the anion.

3. Process of claim 1 wherein said stannic phosphate catalyst contains from 10 to 40 parts of phosphorus per 100 parts per weight of stannic phosphate.

4. Process of claim 1 wherein the reaction is carried out in the presence of steam.

5. Process of claim 1 wherein the activating compound is present in an amount of from 1 to 10 percent by weight based on the stannic phosphate.

6. Process of claim 1 wherein said stannic phosphate catalyst is formed by the reaction of phosphoric acid selected from the group of ortho-phosphoric, pyrophosphoric and polyphosphoric acids with a tin compound selected from the group of stannic oxide hydrates, stannic nitrate, stannic chloride, stannic oxide, stannic sulfate and mixtures of the foregoing.

7. Process of claim 6 wherein said stannic phosphate catalyst is tempered at a temperature of up to 900° C.

References Cited
UNITED STATES PATENTS 3,297,587  1/1967  Scherhag et al. ____ 260—294.9

ALAN L. ROTMAN, Primary Examiner

U.S. Cl. X.R.

252—435, 437